(12) United States Patent
Lewis et al.

(10) Patent No.: US 10,260,541 B2
(45) Date of Patent: **\*Apr. 16, 2019**

(54) PANEL SYSTEMS AND METHODS OF ASSEMBLING PANEL SYSTEMS

(71) Applicant: THE BOEING COMPANY, Chicago, IL (US)

(72) Inventors: Michael Steven Lewis, Lake Forest Park, WA (US); James S. Bradley, Arlington, WA (US); Brad James Reeves, Everett, WA (US)

(73) Assignee: The Boeing Company, Chicago, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/784,250

(22) Filed: Oct. 16, 2017

(65) Prior Publication Data

US 2018/0051731 A1    Feb. 22, 2018

Related U.S. Application Data

(63) Continuation of application No. 14/635,508, filed on Mar. 2, 2015, now Pat. No. 9,810,251.

(51) Int. Cl.
*F16B 5/06* (2006.01)
*B64D 11/04* (2006.01)
(Continued)

(52) U.S. Cl.
CPC ............ *F16B 5/0614* (2013.01); *B64D 11/00* (2013.01); *B64D 11/003* (2013.01); *B64D 11/02* (2013.01);
(Continued)

(58) Field of Classification Search
CPC ................ F16B 5/0614; F16B 5/0607; Y10T 24/44026; Y10T 24/44; B64D 11/003; B64D 11/02; B64D 11/00; B64D 11/04
See application file for complete search history.

(56) References Cited

U.S. PATENT DOCUMENTS

| 5,086,599 A | 2/1992 | Meyerson |
| 6,074,150 A | 6/2000 | Shinozaki et al. |

(Continued)

FOREIGN PATENT DOCUMENTS

| DE | 102012008520 A1 | 10/2013 |
| JP | 0219881 A | 8/1990 |

OTHER PUBLICATIONS

Extended European Search Report for corresponding EP Application No. 16158218.4 dated Jun. 30, 2016 (7 pages).
(Continued)

*Primary Examiner* — Adriana Figueroa
(74) *Attorney, Agent, or Firm* — Jay J. Hoette; The Small Patent Law Group, LLC (57) ABSTRACT

A panel system includes a tab panel having at least one tab extending therefrom. The tab panel has a core and a facesheet adjacent the core. The panel system includes a slot panel having at least one slot receiving the corresponding tab of the tab panel therein. The slot panel has a core and a facesheet adjacent the core. The panel system includes a clip positioned between the tab panel and the slot panel. The clip is at least partially received in the slot. The clip has a tab panel securing member being secured to the tab panel and the clip has a slot panel securing member being secured to the slot panel. The clip securely joins the tab panel to the slot panel.

20 Claims, 5 Drawing Sheets

(51) Int. Cl.
  *F16B 5/01* (2006.01)
  *F16B 21/07* (2006.01)
  *B64D 11/00* (2006.01)
  *B64D 11/02* (2006.01)

(52) U.S. Cl.
  CPC ............... *B64D 11/04* (2013.01); *F16B 5/01* (2013.01); *F16B 21/075* (2013.01); *F16B 5/0635* (2013.01); *Y10T 24/44* (2015.01); *Y10T 24/44026* (2015.01)

(56) References Cited

U.S. PATENT DOCUMENTS

| | | |
|---|---|---|
| 6,481,682 B2 | 11/2002 | Miura |
| 7,152,281 B2 | 12/2006 | Scroggie |
| 7,475,934 B2 | 1/2009 | Sato et al. |
| 7,874,048 B2 | 1/2011 | Katoh et al. |
| 7,963,038 B2 | 6/2011 | Schmits |
| 8,051,539 B2 | 11/2011 | Benedetti et al. |
| 8,567,017 B2 | 10/2013 | Iwahara et al. |
| 8,677,573 B2 | 3/2014 | Lee |
| 8,689,409 B2 | 4/2014 | Hanley et al. |
| 8,695,177 B2 | 4/2014 | Kato et al. |
| 8,961,059 B2 | 2/2015 | Reeves et al. |
| 2010/0072735 A1 | 3/2010 | Kirchen et al. |
| 2012/0311829 A1 | 12/2012 | Dickinson et al. |
| 2014/0064833 A1 | 3/2014 | Reeves et al. |
| 2014/0091588 A1 | 4/2014 | Renke et al. |
| 2015/0121664 A1 | 5/2015 | Nelson |

OTHER PUBLICATIONS

Boatcraft Pacific; Working with Nidaplast; http://boatcraft.com.au/informationpages/nidaplast_working.htm; Boatcraft Pacific Pty. Ltd, , Queensland, Australia.

Fastmount Ltd.; Honeycomb; http://www.fastmount.com/panel_mounting_system/honeycomb; Fastmount Ltd.; Auckland, New Zealand.

Marketing Masters, Inc.; Marketing Masters' Corrosion-Free Composite Inserts; http://www.clipnuts.com/general_uses_inserts.html; Washington, USA.

IT Clips; CNC Panel Joinery Notebook; http://www.itclips.net/2012/04/13/cnc-panel-joinery-notebook/#; IT Clips, Apr. 13, 2012.

PANEL SYSTEMS AND METHODS OF ASSEMBLING PANEL SYSTEMS

CROSS REFERENCE TO RELATED APPLICATIONS

This application is a continuation of and claims priority to U.S. patent application Ser. No. 14/635,508 filed Mar. 2, 2015 (now U.S. Pat. No. 9,810,251 issued Nov. 7, 2017), the subject matter of which is herein incorporated by reference in its entirety.

BACKGROUND

The present disclosure relates generally to panel systems and methods of assembling panel systems, such as panel systems used in aircraft.

Panel systems, such as those used in aircraft, use composite panel structures in forming galleys, lavatories, partitions, stow bins, closets, crew rests, and the like. The panels of the panel systems may be joined together using tab-and-slot joints or mortise-and-tenon joints. For example, one of the panels may have slots formed therein, while the other panel may have tabs extending therefrom that are received in corresponding slots. However, during the manufacture of the panel systems, such known tab and slot joints typically require the use of adhesive to permanently join the panels together. For example, the slots are filled with adhesive and the tabs are set in the deposited glue. Alternatively, a small hole is provided adjacent each slot and, after the tabs are inserted into the slots, adhesive is injected into the hole to fill the slot and secure the tab in the slot.

Existing assembly methods for panel systems are not without disadvantages. For instance, excess adhesive tends to flow out of the slot. The technician cleans the excess adhesive by either wiping the adhesive before curing or by sanding off the adhesive after curing. The installation, use, and removal of such adhesive may increase labor, materials, and tooling costs, which, in turn, may increase overall production costs. In addition, the installation, use, and removal of such adhesive may increase the time to assemble the panel structures, which, in turn, may increase the overall production costs. For example, the panels may need to be clamped together for the entire curing time of the adhesive, which may be hours.

Another problem associated with the use of the adhesive in the slots to hold the tabs occurs after curing. The adhesive tends to pull the opposite facesheet of the panel inward (e.g., toward the tab) and creates an indentation in the finished surface of the panel. Such indentation is typically filled with putty or other filler and sanded to provide a smooth, finished surface. Repairing the indentation may increase labor, materials, and tooling costs, which, in turn, may increase overall production costs. In addition, repairing the indentation may increase the time to assemble the panel structures, which, in turn, may increase the overall production costs.

SUMMARY

In accordance with one embodiment, a panel system is provided including a tab panel having at least one tab extending therefrom. The tab panel has a core and a facesheet adjacent the core. The panel system includes a slot panel having at least one slot receiving the corresponding tab of the tab panel therein. The slot panel has a core and a facesheet adjacent the core. The slot is formed in the facesheet and at least a portion of the core. The panel system includes a clip positioned between the tab panel and the slot panel. The clip is at least partially received in the slot. The clip has a tab panel securing member being secured to the tab panel and the clip has a slot panel securing member being secured to the slot panel. The clip securely joins the tab panel to the slot panel.

In accordance with a further embodiment, a panel system kit is provided including a plurality of panels each having a core between opposite facesheets where each of the panels is configured to have at least one of a slot or a tab. The panel system kit includes a plurality of clips configured to be positioned between corresponding panels to join the panels. Each clip has a slot panel securing member configured to securely engage a corresponding facesheet of the panel having the slot and each clip has a tab panel securing member configured to securely engage a corresponding facesheet of the panel having the tab.

In accordance with a further embodiment, a method of assembling a panel system is provided. The panel system includes a tab panel having at least one tab extending therefrom and a slot panel having at least one slot receiving the corresponding tab of the tab panel, where the tab panel and slot panel each having a core and a facesheet adjacent the core. The panel system further includes a clip having a tab panel securing member and a slot panel securing member. The method includes inserting the clip onto the tab panel adjacent the tab or the slot panel adjacent the slot, inserting the tab in the slot such that the clip is positioned between a portion of the tab panel and a portion of the slot panel, and inserting the slot panel securing member between the facesheet of the slot panel and the core of the slot panel.

The features and functions that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The embodiments described herein include improved joints for panel systems and methods of fabricating such panel systems that provide advantages over known systems and methods. For example, the herein described embodiments may reduce or eliminate excess adhesive and/or may eliminate surface indentations. Described herein are various embodiments of a panel system and a method of assembling a panel system. The panel system includes a tab panel having at least one tab extending therefrom and a slot panel having at least one slot receiving the corresponding tab of the tab panel therein. The panels each have a core and a facesheet adjacent the core. Various embodiments of the panel system include a clip positioned between the tab panel and the slot panel with the clip is at least partially received in the slot. The clip has a tab panel securing member secured to the tab panel and a slot panel securing member secured to the slot panel. The clip securely joins the tab panel to the slot panel. The panel system may be assembled by inserting the clip onto the tab panel adjacent the tab or the slot panel adjacent the slot, inserting the tab in the slot such that the clip is positioned between a portion of the tab panel and a portion of the slot panel, and inserting the slot panel securing member between the facesheet of the slot panel and the core of the slot panel.

Figure 1:
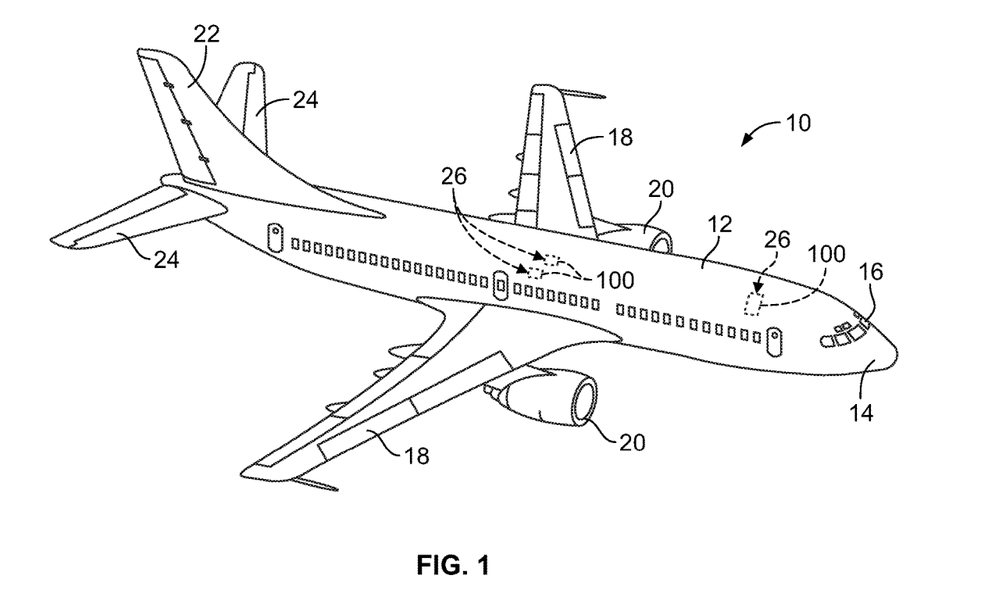
FIG. 1 is a perspective view of an aircraft that may incorporate one or more exemplary embodiments of a panel system formed in accordance with an exemplary embodiment.

FIG. 1 is perspective view of an aircraft 10 that may incorporate one or more exemplary embodiments of a panel system 100 formed in accordance with an exemplary embodiment. The aircraft 10 includes a fuselage 12, a nose 14, a cockpit 16, wings 18, one or more propulsion units 20, a vertical tail portion 22, and horizontal tail portions 24. Although the aircraft 10 is generally representative of a commercial passenger aircraft having one or more structures 26 that incorporate the panel system 100, such as a monument, a galley, a lavatory, partition, stow bins, closets, crew rests, and the like, the teachings of the disclosed embodiments may be applied to other passenger aircrafts, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more structures 26 made with one or more embodiments of the panel system 100.

Figure 2:
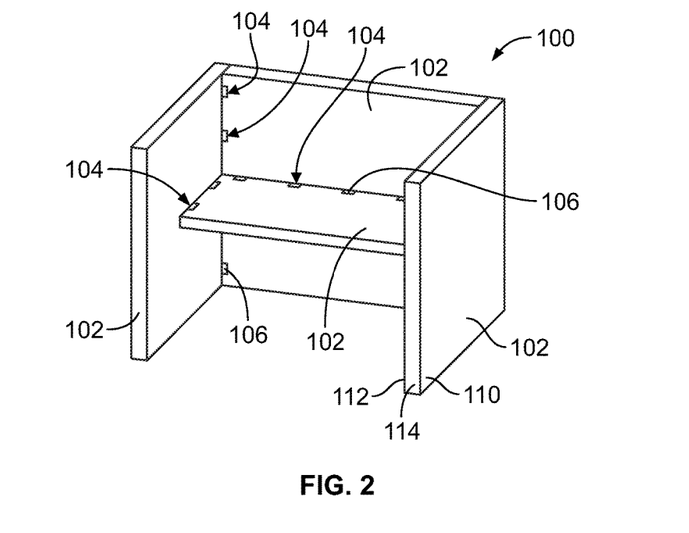
FIG. 2 is a perspective view of the panel system in accordance with an exemplary embodiment.

FIG. 2 is a perspective view of the panel system 100 in accordance with an exemplary embodiment. The panel system 100 includes a plurality of panels 102 that are joined at one or more joints 104. In an exemplary embodiment, the joints 104 are a tab-and-slot arrangement, also referred to as a tenon-and-mortise arrangement. The joints 104 each include clips 106 to hold the panels 102 together. The clips 106 may be self-locking to the panels 102, such that the clips 106 do not require additional fasteners or adhesives to secure the panels 102 together. For example, the clips 106 may snapably engage adjacent panels 102 to hold the panels together. The clips 106 and one or more of the panels 102 may be packaged as a kit and sold to a manufacturer of panel systems. The panels 102 may be sold in pre-formed states, such as with tabs and slots formed therein, or alternatively, the panel system manufacturer may form the tabs and slots in the panels 102 during manufacture. Alternatively, the panels may be sold preformed with the clips 106 already installed and ready for assembly. In other embodiments, the pre-assembled panel systems 100 may be sold to an installer or manufacturer of the aircraft.

Each panel 102 may be a sandwich composite panel designed to be lightweight and meet FFA material requirements, such as flammability requirements. Each panel 102 includes two opposite facesheets 110, 112 having a core 114 sandwiched therebetween. The facesheets 110, 112, also known as skins, may be made of a fiberglass resin, a graphite resin, a para-aramid synthetic fiber resin, a prepreg composite material, or another suitable composite material and may be formed by laying up the materials in a known layup and/or cure process. The facesheets 110, 112 may also be formed of a lightweight metal material, such as aluminum, or a combination of a metal and composite material in alternative embodiments. The core 114 may be a honeycomb core that is lightweight and high-strength. The core 114 may include a foam material such as open cell foam, a polymeric, cellular solid foam, a melamine foam, a closed cell foam, or another suitable foam material. The core 114 may be formed from other materials, such as a meta-aramid material, a resin impregnated paper material, a light-weight metal material, such as aluminum, a combination of metal and composite material, and the like in alternative embodiments.

The panels 102 may be joined at ends or edges of the panels 102, or alternatively may be joined at mid-portions of the panels 102. The panels 102 may have any shape depending on the particular application, and are not limited to the rectangular shapes illustrated in FIG. 2. Optionally, a single panel 102 may be joined to multiple other panels 102. Some panels 102 may define inner panels, some panels 102 may define outer panels, and some panels 102 may define both inner and outer panels of the panel system 100. The joints 104 may be provided at any interval along the panels 102. For example, the joints 104 may be provided at or near the ends or edges of the panels 102, at any mid-portion between the panels 102, and at any spacing from each other.

Figure 3:
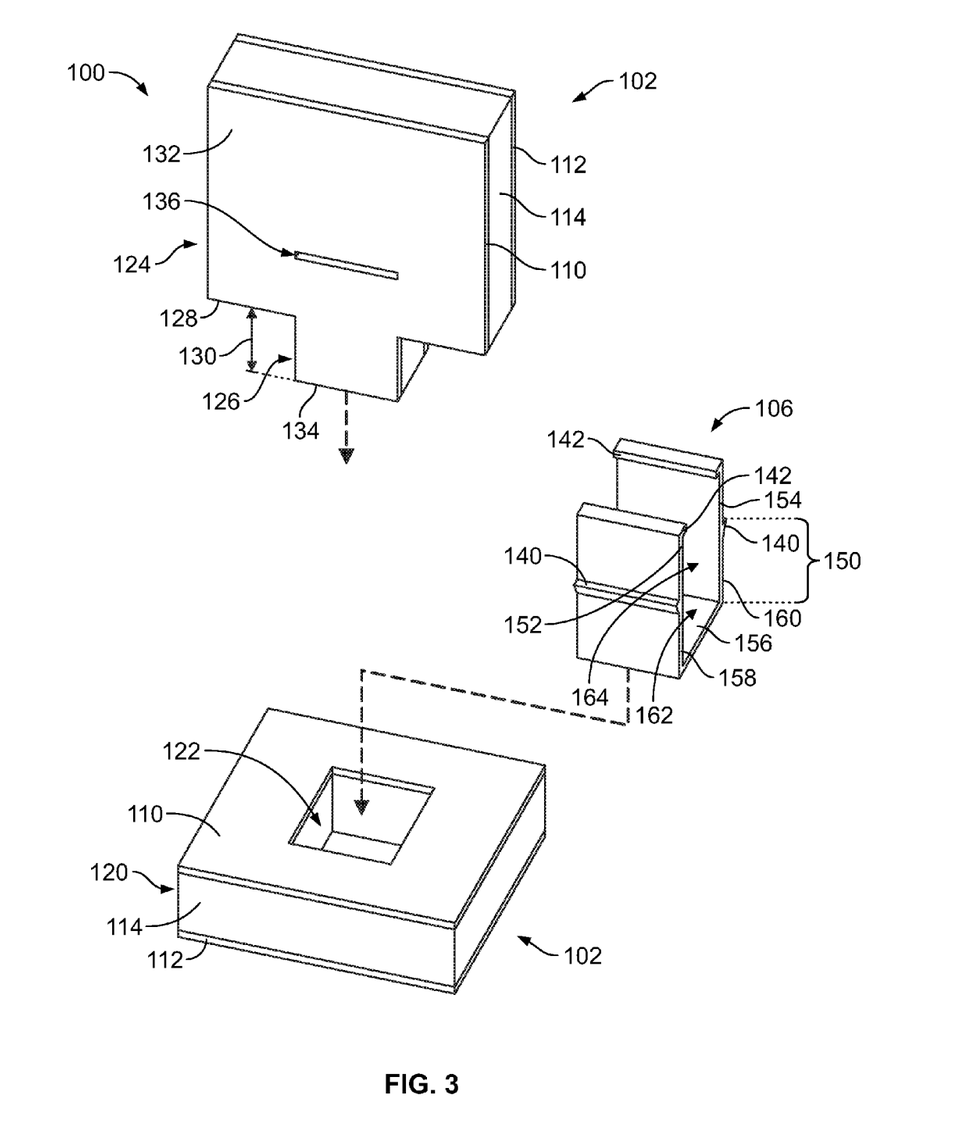
FIG. 3 illustrates a portion of the panel system showing various components of the panel system in an unassembled state.

FIG. 3 illustrates a portion of the panel system 100 showing various components of the panel system 100 in an unassembled state. FIG. 3 shows an exemplary embodiment of one of the clips 106 used to hold the panels 102 together. In the illustrated embodiment, a first panel 120 is provided with a slot 122 formed therein. Such panel, including the slot 122, may be referred to as a slot panel 120 hereinafter. FIG. 3 illustrates a second panel 124 with a tab 126 extending therefrom. Such panel, including the tab 126, may be referred to as a tab panel 124 hereinafter. The slot panel 120 may include any number of slots 122 and the tab panel 124 may include any number of tabs 126. In some embodiments, either or both of the panels 102 may include both slots 122 and tabs 126 for connecting to each other and/or for connecting to other panels 102.

The slot 122 may be formed by milling the slot panel 120 to form the slot 122. For example, the slot 122 may be milled using a computer numeric control (CNC) machine or other machine. The slot 122 is formed through the first facesheet 110 and at least part way through the core 114. A portion of the core 114 is exposed in the slot 122. The slot 122 may extend through the second facesheet 112 in various embodiments. The slot 122 is sized and shaped to receive the tab 126 and the clip 106. In the illustrated embodiment, the slot 122 is generally rectangular; however other shape slots may be used in alternative embodiments. The slot 122 may be provided at or near an edge of the slot panel 120, or alternatively the slot 122 may be provided along an interior portion of the slot panel 120 remote from the edge thereof.

The tab 126 extends from an edge 128 of a main body 132 of the tab panel 124. The tab 126 may be formed by milling the edge 128, such as using a CNC machine or another type of machine. The tabs 126 may extend the entire thickness of the tab panel 124 and include both facesheets 110, 112 and the core 114. Optionally, the edge 128 and end edge 134 may include a facesheet covering the core 114. Alternatively, the core 114 may be exposed at the edge 128 and end edge 134. The tab 126 extends to an end edge 134 away from the main body 132. The tab 126 has a width 130 defined between the main body 132 of the tab panel 124 and the end edge 134. The width 130 may be less than a thickness or depth of the slot panel 120 allowing the tab 126 to be received in the slot 122 such that the main body 132 rests generally flush with the facesheet 110 of the slot panel 120.

In an exemplary embodiment, the tab panel 124 includes one or more channels 136 formed in the facesheet 110 and for the facesheet 112 of the tab panel 124. The channels 136 are configured to receive portions of the clip 106 when assembled. In the illustrated embodiment, the channels 136 may be long, narrow slits milled into the facesheets 110, 112. The channels 136 are positioned a distance away from the end edge 134 of the tab 126 in the illustrated embodiment. The channels 136 are provided in the main body 132, however the channels 136 may be provided in the tab 126 in alternative embodiments. Optionally, each facesheet 110, 112 may include multiple channels 136 associated with each tab 126 for receiving different portions of the clips 106.

The clip 106 is configured to be securely coupled to the slot panel 120 and the tab panel 124 to securely join the tab panel 124 to the slot panel 120. The clip 106 may be self-locking to the slot panel 120 and/or tab panel 124. For example, the clip 106 may be secured to the slot panel 120 without additional fasteners or adhesives. Similarly, the clip 106 may be secured to the tab panel 124 without the use of additional fasteners or adhesives. The clip 106 may snapably engage the slot panel 120 and/or tab panel 124 during assembly. Such self-locking and/or snapable engagement allows for quick installation and assembly of the panel system 100. However, in other various embodiments, the clip 106 may be secured to the slot panel 120 and/or tab panel 124 using adhesive to enhance the mechanical integrity therebetween. For example, the clip 106 may be secured in the slot 122 using adhesive as either a primary or secondary mechanical securing connection thereto.

The clip 106 includes one or more slot panel securing members 140 and one or more tab panel securing members 142. The slot panel securing members 140 secure the clip 106 to the slot panel 120. The tab panel securing members 142 secure the clip 106 to the tab panel 124. In the illustrated embodiment, the slot panel securing members 140 are flanges or protrusions extending outward from the clip 106. Such slot panel securing members 140 are configured to engage the facesheet 110 of the slot panel 120 when the clip 106 is loaded into the slot 122. In the illustrate embodiment, the tab panel securing members 142 are flanges or protrusions extending inward. The tab panel securing members 142 are configured to be received in corresponding channels 136 in the facesheets 110, 112 of the tab panel 124 to securely join the clip 106 to the tab panel 124.

The clip 106 may be manufactured from metal, plastic, or other materials. The clip 106 is U-shaped; however other shapes are possible in alternative embodiments. In the illustrated embodiment, the clip 106 includes a base portion 150 and a pair of legs 152, 154 extending from opposite sides of the base portion 150. The slot panel securing members 140 extend from the base portion 150. The tab panel securing members 142 extend from the legs 152, 154. The base portion 150 is defined by an end wall 156 and opposite side walls 158, 160. The side walls 158, 160 extend from opposite sides of the end wall 156. The leg 152 extends from the side wall 158, and the leg 154 extends from the side wall 160. The base portion 150 defines a pocket 162 between the side walls 158, 160. The pocket 162 is configured to receive at least a portion of the tab 126 when the tab panel 124 is coupled to the slot panel 120.

In an exemplary embodiment, the base portion 150 is generally the portion of the clip 106 that is received in the slot 122. The slot panel securing members 140 extend outward from the side walls 158, 160, away from the pocket 162, to engage the interior surface of the facesheet 110. The slot panel securing members 140 are configured to be positioned between the facesheet 110 and the core 114.

In an exemplary embodiment, the legs 152, 154 extend beyond the side walls 158, 160 and are generally the portions of the clip 106 exterior of the slot 122. The legs 152, 154 are configured to extend along the main body 132 of the tab panel 124. The legs 152, 154 extend beyond the tab 126 along the facesheets 110, 112 of the tab panel 124 to the channels 136. The tab panel securing members extend inward into a space 164 defined between the legs 152, 154. When assembled, the tab panel 124 is positioned in the space 164 and the tab panel securing members 142 extend into the tab panel 124 through the channels 136.

In an exemplary embodiment, the side walls 158, 160 and/or the legs 152, 154 are inwardly tapered. Such inward taper ensures that the clip 106 presses against the tab panel 124 such that the tab panel securing members 142 enter into the channels 136 to engage the tab panel 124. Optionally, when the tab panel 124 in coupled to the slot panel 120 such that the tab 126 is loaded into the pocket 162 and slot 122, the tab 126 presses outward against the sidewalls 158, 160 to ensure that the slot panel securing members 140 are positioned and aligned behind the facesheet 110 of the slot panel 120 and cannot slip through the slot 122.

Figure 4:
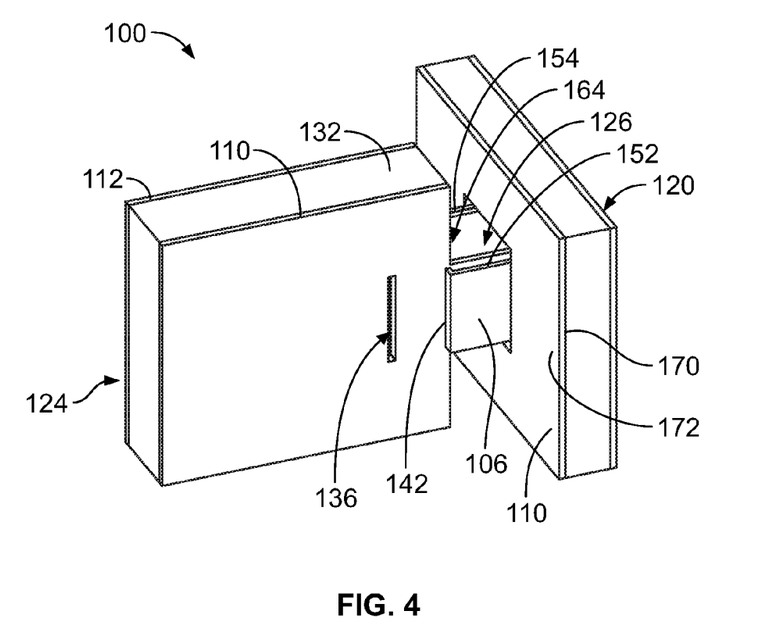
FIG. 4 is a perspective view of a portion of the panel system during assembly.

FIG. 4 is a perspective view of a portion of the panel system 100 during assembly. During assembly, the clip 106 is loaded into the slot 122. The base portion 150 is received in the slot 122 behind an interior surface 170 of the facesheet 110. The legs 152, 154 extend forward of the base portion 150 beyond an exterior surface 172 of the facesheet 110. The clip 106 is open and able to receive a portion of the tab panel 124 therein. For example, the tab 126 is loaded through the space 164 between the legs 152, 154 and into the pocket 162. A portion of the main body 132 of the tab panel 124 is configured to be received in the space 164 between the legs 152, 154. The tab panel 124 is loaded into the clip 106 until the clip 106 is securely joined to the tab panel 124. For example, the tab panel 124 is loaded into the clip 106 until the tab panel securing members 142 are received in the corresponding channels 136 in the facesheets 110, 112 of the tab panel 124. The tab panel securing members 142 clip into the facesheets 110, 112 of the tab panel 124 to securely join the tab panel 124 to the slot panel 120. Optionally, the tab panel securing members 142 may snapably engage the tab panel 124 when the tab panel securing members 142 are aligned with the channels 136.

Figure 5:
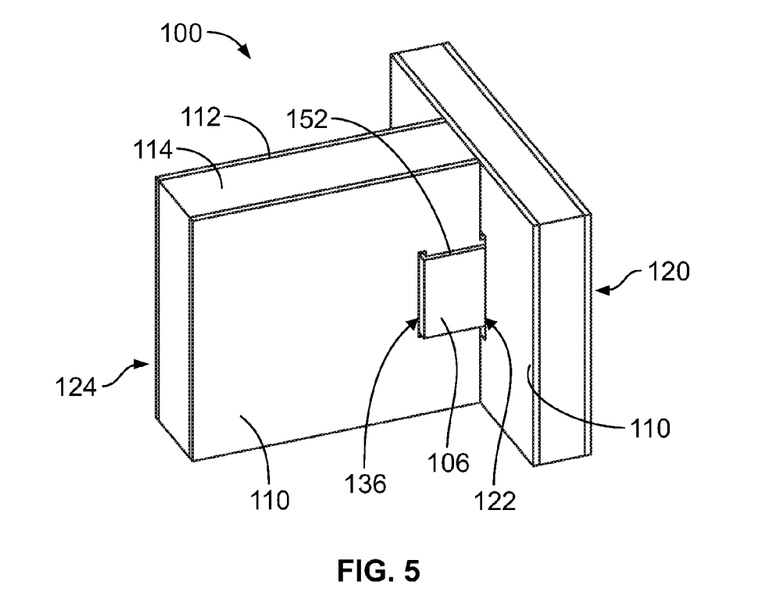
FIG. 5 illustrates a portion of the panel system showing a tab panel joined to a slot panel of the panel system.
Figure 6:
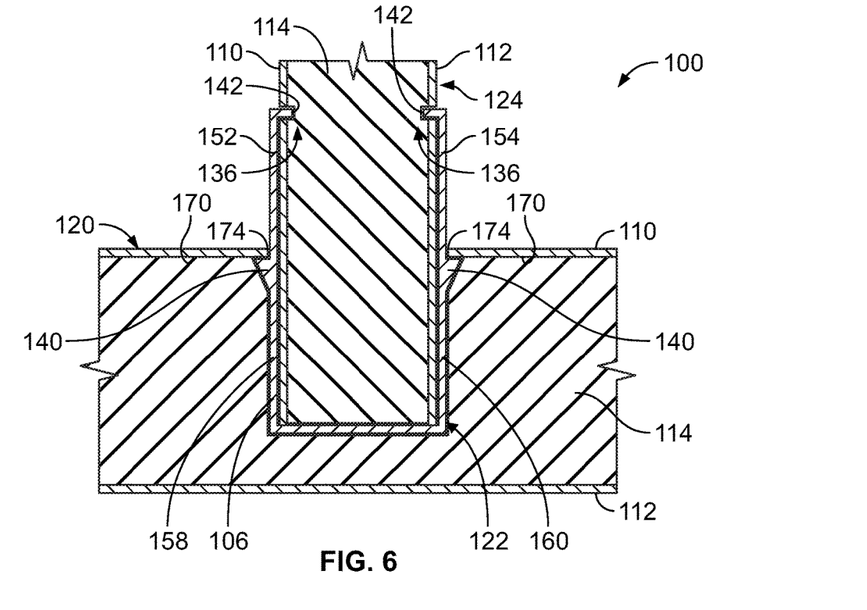
FIG. 6 is a cross-sectional view of the panel system in an assembled state.

FIG. 5 illustrates a portion of the panel system 100 showing the tab panel 124 joined to the slot panel 120. FIG. 6 is a cross-sectional view of the panel system 100 in an assembled state. The clip 106 securely joins the tab panel 124 to the slot panel 120. The tab panel securing members 142 clip into the channels 136 in the facesheets 110, 112 of the tab panel 124 to hold the tab panel 124 relative to the slot panel 120. The legs 152, 154 extend along both sides of the tab panel 124 to the corresponding channels 136.

When assembled, as shown in FIG. 6, the slot panel securing members 140 are captured behind the interior surface 170 of the facesheet 110 of the slot panel 120. The tab panel 124 forces the sidewalls 158, 160 outward ensuring that the slot panel securing members 140 remain locked behind the facesheet 110. The slot panel 120 has an edge 174 around a perimeter of the slot 122. The slot panel securing members 140 are secured against the interior surface 170 adjacent the edge 174. The slot panel securing members 140 are located between the facesheet 110 and portions of the core 114. For example, the core 114 may be at least partially milled out behind the facesheet 110. Alternatively, the slot panel securing members 140 may displace a portion of the core 114 when the clip 106 is loaded into the slot 122.

Figure 7:
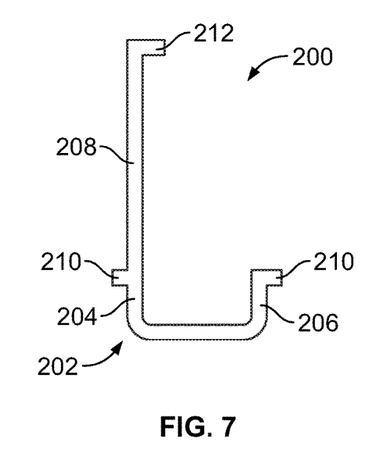
FIG. 7 is a side view of a clip of the panel system formed in accordance with an exemplary embodiment.

FIG. 7 is a side view of a clip 200 formed in accordance with an exemplary embodiment. The clip 200 is similar to the clip 106; however, the clip 200 includes a single leg as opposed to the pair of legs 152, 154 of the clip 106. The clip 200 includes a base portion 202 having sidewalls 204, 206. The clip 200 includes a leg 208 extending from the sidewall 204. The clip 200 includes slot panel securing members 210 extending from the sidewalls 204, 206 and a tab panel securing member 212 extending inward from the leg 208. The single-leg clip 200 is similar to the double-leg clip 106, except one of the legs 152 or 154 is omitted in the single-leg clip 200. Accordingly, at least some of the description related to the clip 106 is applicable to the clip 200. By having a single leg 208 as opposed to a pair of legs, the clip 200 in only visible on one side of the tab panel 124 (shown in FIG. 3). The clip 200 may be better hidden and less visible than the clip 106. For example, the clip 200 may be oriented such that the visible leg 208 is provided on a side of the tab panel 124 that is covered, unexposed, or otherwise less visible in the passenger compartment of the aircraft.

Figure 8:
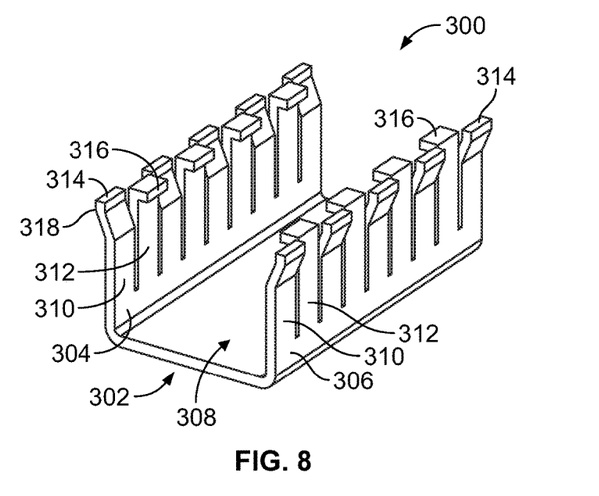
FIG. 8 is a perspective view of a clip of the panel system formed in accordance with an exemplary embodiment.

FIG. 8 is a perspective view of a clip 300 formed in accordance with an exemplary embodiment. The clip 300 is similar to the clips 106, 200; however, the legless clip 300 does not include any legs visible along the corresponding tab panel 124 (shown in FIG. 3). The legless clip 300 is similar to the double-leg clip 106 or the single leg clip 200, except both of the legs 152 or 154 are omitted in the legless clip 300. Accordingly, at least some of the description related to the clip 106 and/or the clip 200 is applicable to the clip 300. The clip 300 is designed to be entirely contained within the slot 122 of the slot panel 120. In other words, the clip 300 is contained entirely behind the facesheet 110 of the slot panel 120.

The clip 300 includes a base portion 302 having sidewalls 304, 306. The sidewalls 304, 306 may be considerably shorter than the sidewalls of the clip 106. The clip 300 may have a series of interspersed slot panel arms 310 and tab panel legs 312. The slot panel arms 310 and tab panel legs 312 are independently moveable relative to each other. The sidewalls 304, 306 and/or the slot panel arms 310 and tab panel legs 312 define a pocket 308 configured to receive the tab 126 of the tab panel 124.

The slot panel arms 310 have corresponding slot panel securing members 314 extending therefrom. The tab panel legs 312 have corresponding tab panel securing members 316 extending therefrom. The slot panel arms 310 and/or the slot panel securing members 314 may be angled outward and extend to distal ends 318. The slot panel securing members 314 may be defined at the distal ends 318, which may engage or abut the interior surface of the facesheet 110 of the slot panel 120 when assembled. For example, the distal ends 318 may be angled away from the pocket 308 such that the slot panel securing members may be aligned behind the facesheet 110 of the slot panel 120.

The tab panel securing members 316 may be flanges angled inward from the tab panel legs 312. The tab panel securing members 316 are configured to be received in corresponding channels 136 formed in the tab panel 124. For example, the channels 136 may be provided in the tab 126 such that, when the tab 126 is loaded into the pocket 308, the tab panel securing members 316 are received in the channels 136 of the tab 126 to secure the tab panel 124 to the slot panel 120. Neither the slot panel arms 310 nor the tab panel legs 312 extend out of the slot 122 such that no portion of the clip 300 is visible after assembly.

In an exemplary embodiment, the slot panel arms 310 and tab panel legs 312 may be independently deflectable relative to each other. Any number of slot panel arms 310 and tab panel legs 312 may be provided along each of the sidewalls 304, 306. In the illustrate embodiment, five slot panel arms 310 and four tab panel legs 312 extend from each of the sidewalls 304, 306; however, any number of slot panel arms 310 and tab panel legs 312 may be provided in alternative embodiments.

Figure 9:
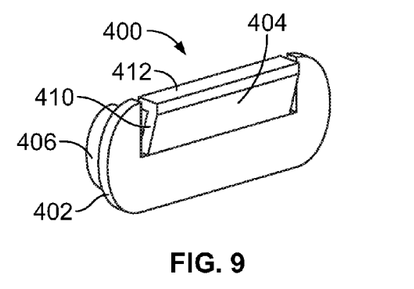
FIG. 9 is a front perspective view of a clip of the panel system formed in accordance with an exemplary embodiment.
Figure 10:
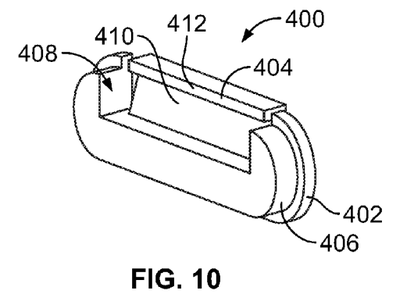
FIG. 10 is a rear perspective view of the clip shown in FIG. 9.

FIG. 9 is a front perspective view of a clip 400 formed in accordance with an exemplary embodiment. FIG. 10 is a rear perspective view of the clip 400. The clip 400 is similar to the clip 106, except the clip 400 is configured to be initially coupled to the tab panel 124 rather than the slot panel 120 (both shown in FIG. 3). For example, the clip 400 includes both tab panel securing members and slot panel securing members either or both of which may snapably couple to the corresponding panels. Accordingly, at least some of the description related to the clip 106 is applicable to the clip 400.

The clip 400 includes a base portion 402. A slot panel securing member 404 extends from the base portion 402 and is configured to engage and securely couple to the slot panel 120. A tab panel securing member 406 extends from the base portion 402 and is configured to engage and securely couple to the tab panel 124.

In an exemplary embodiment, the base portion 402 is a plate. In the illustrated embodiment, the base portion 402 is an oval shaped plate; however, other shapes are possible in alternative embodiments. The tab panel securing member 406 extends rearward from the base portion 402. In the illustrated embodiment, the tab panel securing mechanism 406 is a protrusion that is generally oval shaped configured to be received in an oval shaped channel formed in the tab panel. Other shapes are possible in alternative embodiments.

The tab panel securing mechanism 406 includes a cutout in a portion thereof generally aligned with the slot panel securing member 404.

In the illustrated embodiment, the slot panel securing mechanism 404 includes a deflectable tab 410 hingedly coupled to the base portion 402. The deflectable tab 410 may be deflected into the cutout 408 and may be deflected outward from the base portion 402. In an exemplary embodiment, the deflectable tab 410 is angled forward or outward from the base portion 402. The slot panel securing member 404 includes a flange 412 at a distal end of the deflectable tab 410. The flange 412 in configured to engage the slot panel 120 to retain the clip 400 in the slot panel 120.

Figure 11:
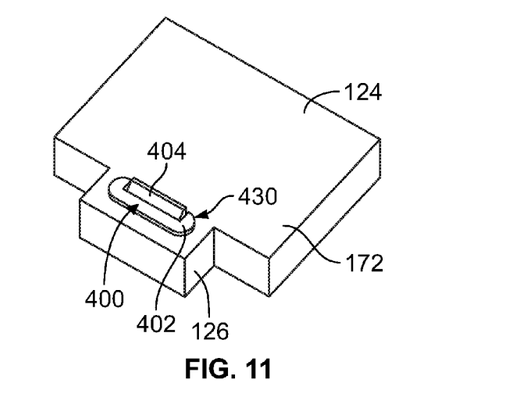
FIG. 11 illustrates the clip shown in FIG. 9 coupled to the tab panel.

FIG. 11 illustrates the clip 400 coupled to the tab panel 124. In an exemplary embodiment, clips 400 are provided on both side of the tab panel 124. The clip 400 is coupled to the tab panel 124 such that the base portion 402 abuts against the exterior surface 172 of the facesheet 110 of the tab panel 124. The tab panel 124 includes a channel 430 that receives the clip 400. The channel 430 is provided in the tab 126. The channel 430 is located such that the slot panel securing member 404 is configured to be located below the facesheet 110 of the slot panel 120 when the tab panel 124 is coupled to the slot panel 120. The tab panel securing mechanism 406 (shown in FIG. 10) is received in the channel 430 and secured therein. Optionally, the clip 400 may be secured in the channel 430 using adhesive or a friction fit. Alternatively, the tab panel securing member 406 may include a flange or other protrusion that is configured to be captured behind the facesheet 110 of the tab panel 124. When the clip 400 is coupled to the tab panel 124, the slot panel securing mechanism 404 is angled outward from the base portion 402. The flange 412 is outward of, or forward of, the exterior surface 172 of the facesheet 110 of the tab panel 124.

Figure 12:
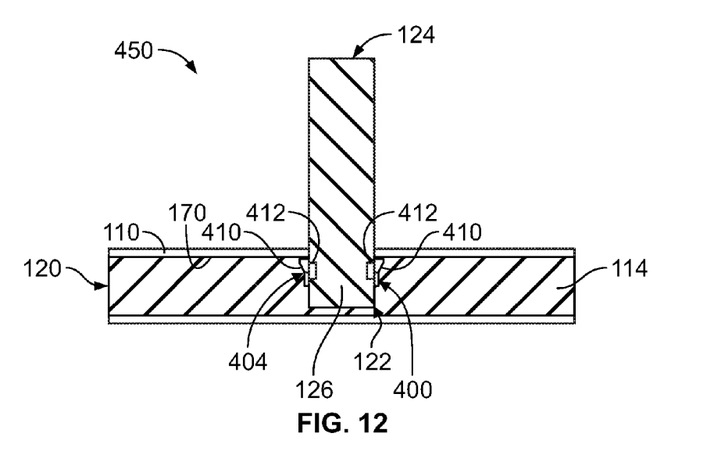
FIG. 12 is a cross-section view of the panel system using the clips shown in FIG. 9 to secure the tab panel to the slot panel.

FIG. 12 is a cross-section view of a panel system 450 using the clips 400 to secure the tab panel 124 to the slot panel 120. The clips 400 are provided on both sides of the tab panel 124. The slot panel securing members 404 are flared outward and are configured to be captured behind the interior surface 170 of the facesheet 110 of the slot panel 120. The slot panel securing members 404 are positioned between the facesheet 110 and the core 114.

In an exemplary embodiment, the slot panel securing members 404 are deflectable. For example, the deflectable tabs 410 may be deflected inward by the facesheet 110 of the slot panel 120 when the tab 126 of the tab panel 124 is loaded into the slot 122. After the tab panel 124 is fully mated with the slot panel 120, the slot panel securing members 404 are configured to engage and secure to the slot panel 120. In an exemplary embodiment, the deflectable tabs 410 are deflectable between an unlatched position and a latched position. The deflectable tabs 410 are deflected to the unlatched position as the clip 400 is loaded into the slot 122 of the slot panel 120. For example, the facesheet 110 may cause the deflectable tabs 410 to deflect inward to the unlatched position. The deflectable tabs 410 are deflected outward to the latched position after the deflectable tabs 410 clear the facesheet 110 of the slot panel 120. In the latched position, the flanges 412 engage the interior surface 170 of the facesheet 110 of the slot panel 120 to secure the clip 400 in the slot 120. In an exemplary embodiment, the deflectable tabs 410 are elastically deflected from the latched position to the unlatched position as the clips 400 are loaded into the slot 122. Once the facesheet 110 no longer presses the deflectable tabs inward, the deflectable tabs 410 return to the normal, latched position to securely join the tab panel 124 to the slot panel 120.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A panel system comprising:
a tab panel having a main body including opposite first and second sides extending to an edge, the tab panel having at least one tab extending from the edge of the main body and being coplanar with the main body between the first and second sides of the main body, the tab panel having a core and a facesheet adjacent the core along the first side, the tab panel having a channel in the facesheet;
a slot panel having at least one slot for receiving the corresponding tab of the tab panel therein, the slot panel having a core and a facesheet adjacent the core, the slot formed in the facesheet and at least a portion of the core; and
a clip positioned between the tab panel and the slot panel, the clip being at least partially received in the slot to engage the core and the facesheet of the slot panel, the clip having a tab panel securing member received in the channel of the tab panel to secure to the tab panel, the clip having a slot panel securing member received in the slot of the slot panel to secure to the slot panel, the clip securely joining the tab panel to the slot panel.

2. The panel system of claim 1, wherein the tab panel securing member snapably engages the tab panel and the slot panel securing member snapably engages the slot panel to securely join the clip to the tab panel and the slot panel, respectively.

3. The panel system of claim 1, wherein the clip is secured to the tab panel using adhesive.

4. The panel system of claim 1, wherein the clip is secured to the slot panel using adhesive.

5. The panel system of claim 1, wherein the slot panel securing member is positioned between the facesheet and the core of the slot panel.

6. The panel system of claim 1, wherein the slot panel securing member comprises a flange extending into the slot behind the facesheet of the slot panel, the facesheet capturing the flange of the clip in the slot.

7. The panel system of claim 1, wherein the clip comprises a base portion received in the slot, the base portion defining a pocket receiving the tab, the slot panel securing member extending outward from the base portion to engage the facesheet of the slot panel.

8. The panel system of claim 7, wherein the tab panel securing member extends from the base portion to engage the facesheet of the tab panel.

9. The panel system of claim 7, wherein the tab includes the channel, the tab panel securing member extending inward into the pocket and engages the tab of the tab panel to secure the tab in the pocket.

10. The panel system of claim 7, wherein the clip includes a leg extending from the base portion along the main body of the tab panel, the tab panel securing member extending from the leg through the channel in the facesheet of the tab panel to secure the clip to the tab panel.

11. The panel system of claim 7, wherein the facesheet of the tab panel is a first facesheet and the tab panel includes a second facesheet adjacent the core opposite the first facesheet, the clip includes a first leg extending from the base portion along the first facesheet and a second leg extending from the base portion along the second facesheet, a space being defined between the first and second legs, the core of the tab panel being positioned in the space, the tab panel securing member comprising a first flange extending from the first leg into the space and engaging the tab panel, the tab panel securing member comprising a second flange extending from the second leg into the space and engaging the tab panel.

12. The panel system of claim 1, wherein the clip is secured in the channel of the tab panel prior to loading the tab into the slot.

13. The panel system of claim 1, wherein the clip is secured in the slot of the slot panel prior to loading the tab into the slot.

14. The panel system of claim 1, wherein the facesheet of the slot panel has an edge around a perimeter of the slot, the slot panel includes an interior surface and an exterior surface, the slot panel securing member is secured against the interior surface adjacent the edge.

15. The panel system of claim 1, wherein the clip is contained interior of the slot panel between first and second sides of the slot panel interior of an exterior surface of the facesheet of the slot panel at the first side and interior of an exterior surface of a second facesheet of the slot panel at the second side of the slot panel.

16. The panel system of claim 1, wherein the clip extends from the slot beyond an exterior surface of the facesheet of the slot panel along an exterior of the main body of the tab panel to the channel of the tab panel.

17. The panel system of claim 1, wherein the tab panel includes at least one slot and the slot panel includes at least one tab with a corresponding clip therebetween.

18. A method of assembling a panel system, the panel system including a tab panel having at least one tab extending from an edge of a main body of the tab panel between opposite first and second sides of the main body such that the tab is coplanar with the main body between the first and second sides of the main body, the main body having a channel, and the panel system including a slot panel having at least one slot receiving the corresponding tab of the tab panel, the tab panel and slot panel each having a core and a facesheet adjacent the core, the panel system further including a clip having a tab panel securing member and a slot panel securing member, the method comprising:

inserting the clip into the slot of the slot panel such that the slot panel securing member is positioned between the facesheet of the slot panel and the core of the slot panel to secure the clip to the slot panel;

inserting the tab in the slot such that the main body extends away from the slot panel and such that the clip is positioned between a portion of the tab panel and a portion of the slot panel; and inserting the tab panel securing member into the channel of the tab panel to secure the clip to the tab panel.

19. The method of claim 18, wherein said inserting the clip into the slot of the slot panel comprises pressing the slot panel securing member outward such that the slot panel securing member is captured behind the facesheet of the slot panel.

20. The method of claim 18, wherein said inserting the clip into the slot of the slot panel comprises inserting a base portion of the clip into the slot such that a leg portion of the clip extends exterior of the slot panel along the tab panel to the channel.

* * * * *